United States Patent [19]

Merle

[11] Patent Number: 4,755,243

[45] Date of Patent: Jul. 5, 1988

[54] METHOD FOR MAKING A TIRE

[75] Inventor: Michel Merle, Clermont-Ferrand, France

[73] Assignee: Compagnie Generale des Etablissements Michelin, Clermont-Ferrand, France

[21] Appl. No.: 99,642

[22] Filed: Sep. 23, 1987

Related U.S. Application Data

[60] Continuation of Ser. No. 870,459, Jun. 4, 1986, abandoned, which is a division of Ser. No. 802,865, Nov. 27, 1985, Pat. No. 4,625,785, which is a division of Ser. No. 579,213, Feb. 10, 1984, Pat. No. 4,580,611.

[30] Foreign Application Priority Data

Feb. 16, 1983 [FR] France .................. 83 02625

[51] Int. Cl.$^4$ .................. B29D 30/10; B29D 30/20
[52] U.S. Cl. .................. 156/125; 156/133; 264/326
[58] Field of Search ............ 156/123, 124, 125, 133; 264/239, 271, 275, 326; 425/120, 130, 134; 152/526, 537, 452, 527; 139/408, 411, 413, 415, 423; 428/258, 245, 259, 292–295

[56] References Cited

U.S. PATENT DOCUMENTS

| 697,390 | 4/1902 | Beck | 152/358 |
| 1,335,311 | 3/1920 | Zeglen | 152/358 |
| 1,347,847 | 7/1920 | Grabau et al. | 152/358 |
| 1,756,151 | 4/1930 | Gardiner | 139/408 |
| 3,000,771 | 9/1961 | Runton | 139/408 |
| 3,197,021 | 7/1965 | Williams | 139/411 |
| 3,205,119 | 9/1965 | Paul | 139/415 |
| 3,774,662 | 11/1973 | Neville et al. | 139/415 |
| 4,088,523 | 5/1978 | Gallizia et al. | 156/125 |
| 4,580,611 | 4/1986 | Merle | 152/452 |
| 4,625,785 | 12/1986 | Merle | 152/452 |

FOREIGN PATENT DOCUMENTS

| 0005423 | 11/1979 | European Pat. Off. . |
| 2830331 | 1/1980 | Fed. Rep. of Germany . |
| 0438109 | 5/1912 | France . |
| 1526185 | 5/1968 | France . |
| 2421969 | 11/1979 | France . |
| 57-1268719 | 3/1982 | Japan . |
| 0019412 | of 1910 | United Kingdom . |
| 0139562 | 3/1920 | United Kingdom . |
| 0168619 | 9/1921 | United Kingdom . |
| 1273528 | 5/1972 | United Kingdom ............... 139/415 |

Primary Examiner—Robert A. Dawson
Assistant Examiner—Ramon R. Hoch
Attorney, Agent, or Firm—Brumbaugh, Graves, Donohue & Raymond

[57] ABSTRACT

A reinforcement ply intended for use in a tire is characterized by the fact that the reinforcement ply is formed, at least in part, of a fabric having the following properties: (a) the fabric comprises a three-dimensional body and reinforcement threads arranged in the body and held by the body; and (b) practically all the voids in the fabric are capable of being impregnated with at least one material which forms part of the structure of the tire. The invention also relates to these plies which are impregnated with at least one material which forms part of the structure of the tires. The invention further relates to tires having at least one reinforcement ply, as well as to the methods for obtaining such tires.

2 Claims, 3 Drawing Sheets

METHOD FOR MAKING A TIRE

This application is a continuation of application Ser. No. 870,459, filed on June 4, 1986, now abandoned, which is a divisional application of application Ser. No. 802,865, filed Nov. 27, 1985 (now U.S. Pat. No. 4,625,785, granted Dec. 2, 1986), which in turn is a divisional application of application Ser. No. 579,213, filed Feb. 10, 1984 (now U.S. Pat. No. 4,580,611, granted Apr. 8, 1986).

The present invention relates to tires. More particularly, the invention relates to tires having "reinforcements" intended to stiffen one or more parts of the tires, the reinforcements being each formed of at least one ply referred to as the "reinforcement ply."

The invention concerns, in particular, tires comprising a reinforcement intended to stiffen their crown in order to permit the crown to withstand the stresses resulting from travel. This reinforcement is referred to as the "crown reinforcement" in the body of this disclosure.

Each reinforcement ply has, in general, a practically two-dimensional structure, in the form, for instance, of an assembly of reinforcement cords arranged in a single thickness.

Such plies can be used as is for the production of tires by building on a drum or by pouring in a mold, as described, for instance, in the Japanese Patent Application published after examination under No. 57-12,687 or in the European Patent Application published under No. 5,423. In these processes, these plies are not placed directly on the surface of the drum or mold, because in such case the tires would be excessively fragile upon travel. Moreover, in order to impart the necessary mechanical properties to the tires, these plies must be arranged at a given level within the thickness of the crown. These plies are therefore arranged on a material which has been previously placed on the surface of the drum or mold so that these plies will be protected by a substantial thickness of material in the finished tires. These techniques lead to complicated and/or costly operations which result in variations in quality from one tire to the next during the course of manufacture.

In West German printed application No. 2,830,331 it has been proposed to provide these plies with spurs and to then arrange these plies in a mold in such a way that the spurs rest against the surface of the core of the mold. The purpose of this is to coat the plies with the poured material on all sides. The number of such spurs is necessarily limited, and hence the formation of only a few zones of contact of substantial cross section each. This results in substantial interruptions of continuity within the tire and risks of defective bonding. Furthermore, these spurs cause a break in the symmetry of revolution within the tire due to the fact that the plies assume a practically prismatic shape. All these drawbacks remain even if the material which forms the spurs and the poured material are similar or identical, and these drawbacks are the source of vibrational phenomena which are harmful both to comfort and to the life of the tire.

French published patent application No. 2,421,969 describes a fabric of three-dimensional structure comprising two groups of warp threads: the warp threads of the first group are distributed so as to form the body of the fabric while the warp threads of the second group are distributed so as to form at least one separating woven ply. This fabric thus makes it possible to establish an arrangement for the connecting of two materials of different nature without the products in question being in contact in view of the presence of the separating ply. Such a fabric is not adapted to the production of reinforcements for tires.

The object of the invention is to eliminate these drawbacks.

Accordingly, the reinforcement ply of the invention which is intended for use in a tire is characterized by the fact that the reinforcement ply is formed, at least in part, by a fabric having the following properties:

(a) the fabric has a three-dimensional body and reinforcement threads arranged in the body and held by the body;

(b) practically all the voids in the fabric are capable of being impregnated with at least one material which forms part of the structure of the tire.

The invention also relates to these plies which are impregnated with at least one material which forms part of the structure of the tires. The invention further relates to tires having at least one reinforcement ply as well as to the methods for obtaining such tires.

The examples which follow as well as the entirely schematic figures in the drawing corresponding to these examples are intended to illustrate the invention and to facilitate an understanding of it, without, however, limiting its scope.

Figure 1:
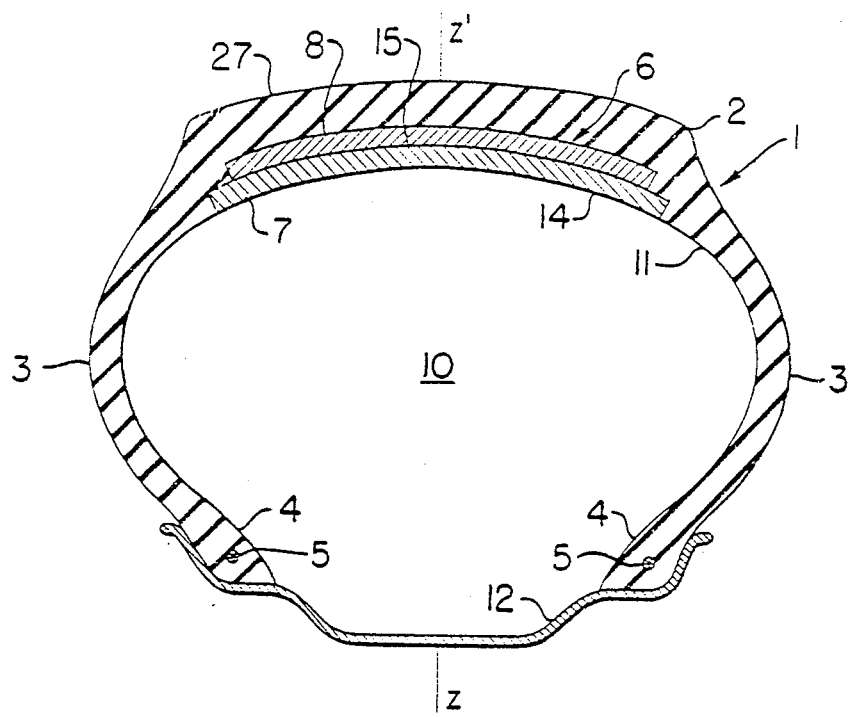
FIG. 1 shows, in radial section, a tire having a crown reinforcement comprising two reinforcement plies according to the invention.

FIG. 1 shows a tire 1. This tire has a crown 2, two sidewalls 3, and two beads 4, each bead being, for instance, reinforced by a bead ring 5.

The crown 2 comprises a reinforcement 6; this crown reinforcement 6 is formed of two superposed reinforcement plies 7, 8, at times referred to as "working plies" in the tire industry, each of these reinforcement plies 7, 8 being in accordance with the invention.

Figure 2:
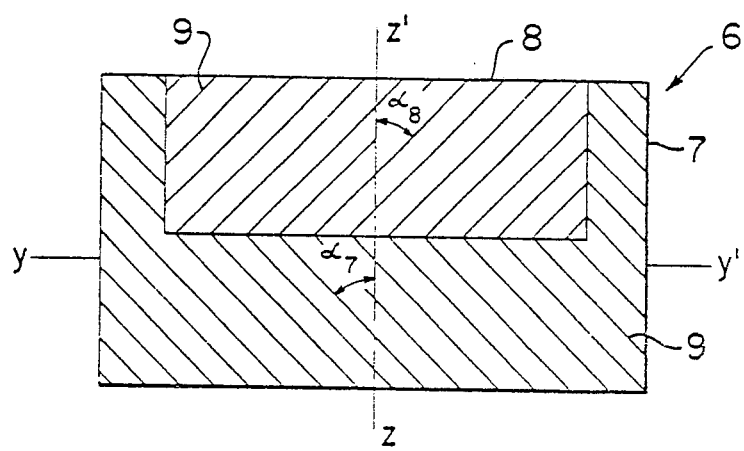
FIG. 2 shows, in top view, a portion of the crown reinforcement of the tire shown in FIG. 1.

FIG. 2 shows, in top view, a portion of these reinforcement plies 7, 8, the entire portion of the crown 2 present above these plies being assumed removed. Each of the plies 7, 8 has reinforcement threads 9 parallel to each other, the direction of the reinforcement threads of one ply crossing that of the reinforcement threads of the other ply. For clarity in the drawing, the other elements entering into the composition of the plies 7, have not been shown in FIG. 2, these elements being described in further detail subsequently. The reinforcement threads 9 of the ply 7 form an acute angle $\alpha_7$ with the equatorial plane of the tire 1, this equatorial plane being the plane perpendicular to the axis of revolution of the tire 1 and passing through the middle of the crown 2. In FIGS. 1 and 2, this equatorial plane is schematically indicated by the line zz' and in FIG. 2 the axis of revolution cf the tire 1 is indicated by the line yy'. The reinforcement threads 9 of the ply 8 form an acute angle $\alpha_8$ with the equatorial plane zz'. These angles $\alpha_7, \alpha_8$ are arranged on opposite sides of the equatorial plane zz', each of these angles being, for instance, between 15° and 30°. For clarity in the drawing, the reinforcement threads 9 have been shown further apart in each ply 7, 8 than they actually are.

The ply 7 is located below the ply 8, that is to say this ply 7 is closer ro the internal cavity 10 of the tire than the ply 8 is, the cavity 10 being defined by the inner face 11 of the tire 1 and the rim 12 on which the tire 1 is mounted. In other words, the radial distance of the ply 8 is greater than the radial distance of the ply 7, these radial distances—not shown in the drawing for purposes of simplification—being, by definition, measured with reference to the axis of revolution yy' and in the equatorial plane zz'. The ply 7 is called the "lower ply" and the ply 8 the "upper ply." It goes without saying that the width of each ply, measured along said ply, in a plane containing the axis of revolution yy' can be equal to or greater or less than the width of the other ply, measured under the same conditions. Thus, in FIG. 1 the lower ply 7 has been shown wider than the upper ply 8.

Figure 3:
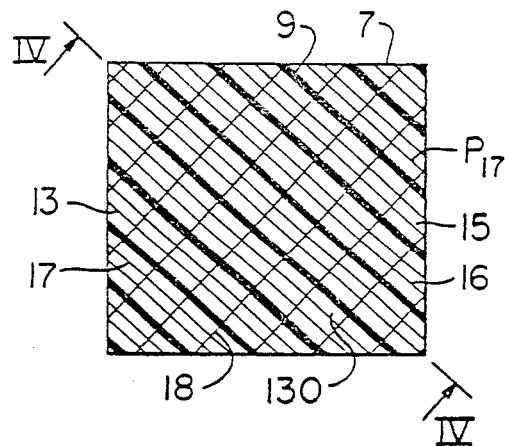
FIG. 3 shows, in top view, a portion of the lower ply of the crown reinforcement shown in FIGS. 1 and 2, this ply being formed of a fabric having a three-dimensional body.
Figure 4:
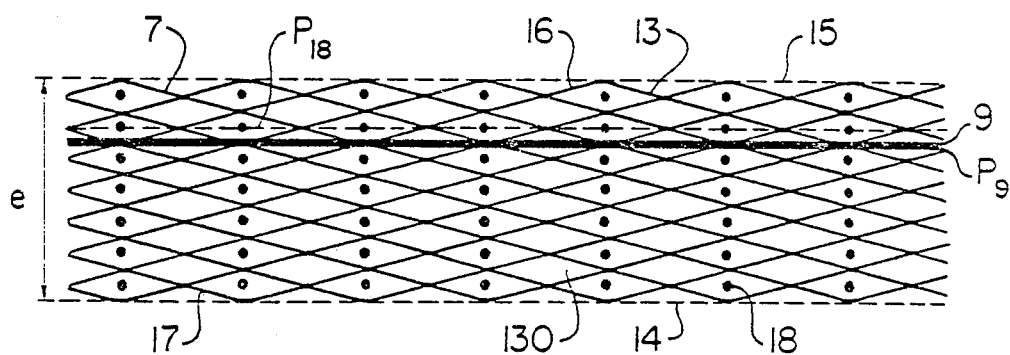
FIG. 4 is a section through a portion of the lower ply which is shown in FIG. 3, this section being taken along the line IV—IV of FIG. 3.

FIGS. 3, 4 show a portion of the lower ply 7. This ply 7 is formed of a fabric 13 having two principal faces 14, 15. These faces 14, 15 are shown in the form of straight dashed lines in FIG. 4, these faces being then flat, that is to say the fabric 13 is shown in FIGS. 3, 4 before its use in the crown 2, this fabric 13 being then assumed arranged in such a manner as to have a generally flat shape, the face 15 being the upper face of this fabric 13 and the faces 14, 15 being, for instance, parallel.

The thickness "e" of the fabric 13 is the distance between the faces 14, 15.

The fabric 13 comprises a three-dimensional body 16. The reinforcement threads 9 of this reinforcement ply 7 are part of the fabric 13 and are arranged in the body 16 and held by the body 16. This body 16 is a woven body formed of warp threads 17 and woof threads 18. The expression "thread" is to be understood in a very general sense, that is to say each of the threads 9, 17, 18 may be formed, for instance, either of a single unit thread or of an assembly of several unit threads forming, for instance, a cable, each unit thread being possibly formed either of a single filament or of several filaments. Each of these threads 9, 17, 18 can also be formed, for instance, of an assembly of fibers or one or more ribbons. Each warp thread 17 undulates practically within a plane $P_{17}$ perpendicular to the faces 14, 15, this warp thread 17 being alternately tangent to one of these principal faces and then to the other. The woof threads 18, which are for instance linear, are arranged between the warp threads 17, practically in several planes $P_{18}$ within the thickness "e" (FIG. 4), these planes being parallel to the principal faces 14, 15. The number of these planes $P_{18}$ is preferably equal to at least four. The mean orientation of the warp threads 17 and the orientation of the woof threads 18 are practically perpendicular, the planes $P_{17}$ being practically perpendicular to the planes $P_{18}$, one of these planes $P_{18}$ being shown in dashed line in FIG. 4.

The structure of the body 16 is therefore three-dimensional, because the threads 17, 18 which constitute it are distributed in all three dimensions. This body 16 serves as a sort of scaffolding for the reinforcement threads 9, and it is capable of retaining a three-dimensional structure even if the threads 9 are removed from the fabric 13.

The structure of the body 16 is the same as that described in French Patent No. 1,526,185. The reinforcement threads 9 maintained by the body 16 may constitute warp threads or woof threads of the fabric 13. It is possible furthermore to employ woof threads 18 of such a type that they are undulated, for instance, in order to bind the reinforcement threads 9 when the latter are warp threads. The direction of the woof threads 18 is then represented by their mean direction. It should be pointed out furthermore that the threads 17 and/or 18 may possibly be replaced in part by reinforcement threads 9. The reinforcement threads 9 are arranged in such a manner that they have no contact with at least one of the principal faces 14, 15.

In the example shown in FIGS. 3, 4, these reinforcement threads 9 are substantially linear and are arranged in a plane $P_9$ which is parallel to the planes $P_{18}$ and located between two successive planes $P_{18}$. Each warp thread 17 has a mean orientation parallel to the reinforcement threads 9, the reinforcement threads 9 being parallel to the planes $P_{17}$ and separated from each other, FIG. 4 being a section along a plane parallel to the planes $P_{17}$. In the example described, the reinforcement threads 9 therefore have no contact with the two principal faces 14, 15.

The structure of the upper ply 8 is similar to the structure previously described for the lower ply 7. The crown reinforcement 6 could possibly be formed of a single ply, the reinforcement threads 9 of said ply then describing, for instance, circles parallel to the equatorial plane within the tire 1. It goes without saying, furthermore, that the crown reinforcement 6 could be formed of more than two plies.

The body 16 has the sole role of holding the reinforcement threads 9. The threads 17, 18 constituting this body can therefore be made of very different materials, inorganic, metallic or organic, even if their mechanical properties and particularly their tensile strength are not very high. For example, each of the threads 17, 18 is made with an organic polymer in order to be of low weight. This organic polymer is, for instance, rayon, an aromatic or nonaromatic polyamide, a polyester, a polyvinyl alcohol or a polyolefin. It may be advantageous to make the threads 17, 18 of a material which is compatible with the material with which they are in contact in the tire 1, or identical to said material, these threads 17, 18 being, for instance, made of polyurethanes if the tire 1 is produced by molding materials capable of reacting with each other to give polyurethanes. It may also be advantageous to make the threads 17, 18 of a thermoplastic material in order to facilitate the cutting out of the body 16 and/or the welding of the. ends of the body 16 by thermal means.

The reinforcement threads 9 must in their turn be capable of withstanding the stresses to which the crown 2 is subjected. They therefore should have high mechanical properties, and in particular the tensile strength of these threads should be high. These reinforcement threads 9 are made for instance of a metallic material, in particular steel, an inorganic material, in particular glass, or an organic material, for instance in order to decrease the weight and limit the risks of corrosion. This organic material may, for instance, be rayon, an aromatic or nonaromatic polyamide, a polyester or a polyvinyl alcohol. It goes without saying that the threads 9, 17, 18 can be made of identical or different materials and that each of these threads may comprise several materials, with possibly various adjuvants, in particular fillers.

The threads 17, 18 which constitute the body 16 preferably have a cross section whose surface has an area smaller than the area of the surface of the cross section of the reinforcement threads 9 so that the contribution made by these threads 17, 18 to the reinforcement of the ply 7, 8 is as low as possible. The threads 17, 18 advantageously have a cross section whose surface has an area at most equal to one-quarter of the area of the surface of the cross section of the reinforcement threads 9. Under these conditions, when the threads 9, 17, 18 have the shape of a circular cylinder, the diameter of the threads 17, 18 is preferably less than the diameter of the reinforcement threads 9 and preferably the diameter of the threads 17, 18 is at most equal to one-half the diameter of the reinforcement threads 9. When the reinforcement threads 9 of one ply 7, 8 have different cross sections, for instance different diameters, the comparison of the cross sections between the threads 17, 18 and the reinforcement threads 9 should be effected on basis of the reinforcement threads 9 which have the smallest cross section, for instance the smallest diameter. In practice, it is, however, frequently preferably to use an identical cross section for all the reinforcement threads 9 of the same ply 7, 8 or possibly of all the reinforcement plies 7, 8 forming part of the structure of the tire 1. With respect to the threads 17, 18 it goes without saying that their cross sections may be identical or different.

By way of example, the characteristics of the tire 1 with its reinforcement plies 7, 8 according to the invention are as follows:

The tire 1 is of size 135-13. It is made by the casting of fluid or pasty materials capable of reacting to give a polyurethane, this production taking place in accordance with a single-step process.

Figure 5:
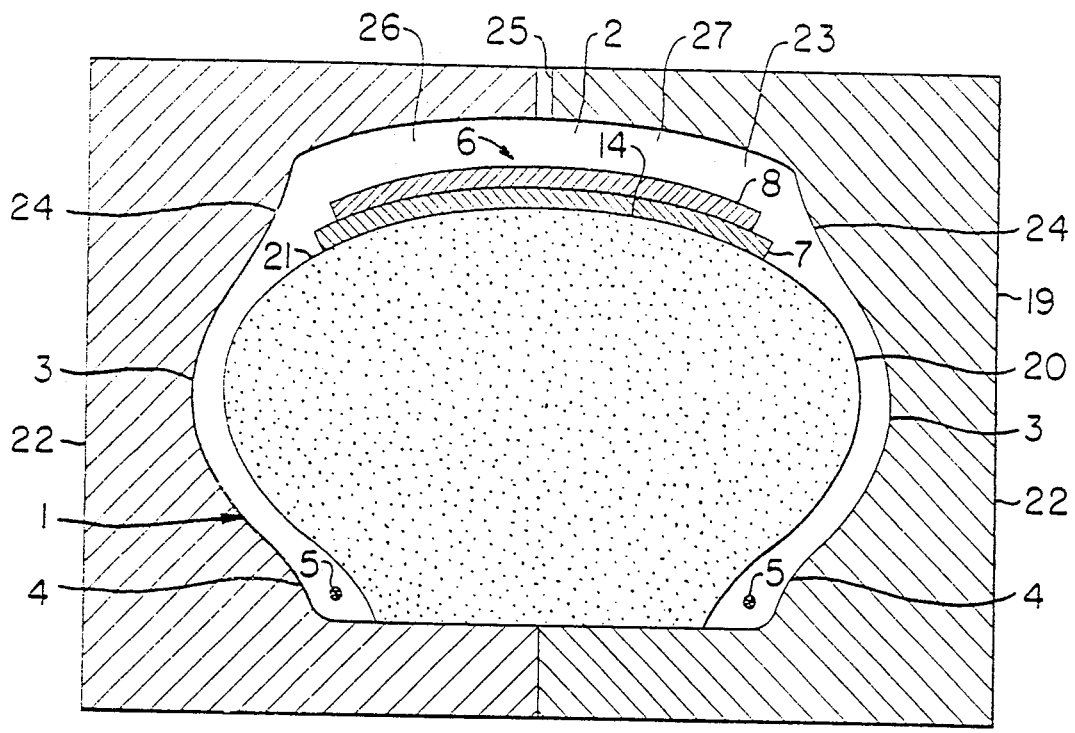
FIG. 5 shows, in radial section, a portion of a mold used for the manufacture of the tire shown in FIG. 1.

This process employs a mold 19 shown in part in FIG. 5. The reinforcement 6 is placed on the core 20 of the mold 19 in such a manner that the lower face 14 of the ply 7 is directly in contact with the convex face 21 of the core 20, the upper ply 8 thus resting on the lower ply 7. The two shells 22 of the mold 19 are then closed around the core 20 so as to obtain a cavity 23 defined by the convex face 21 of the core 20 and the concave faces 24 of the shells 22. The reinforcement 6 is thus arranged within this cavity 23 as are the bead rings 5 which have been previously fixed in the mold 19 by known means before closing the shells 22.

This cavity 23 has the same shape as the finished tire 1. A mixture which forms a polyurethane 26 in the mold 19 is then introduced, in known manner, into the cavity 23 through the conduit 25. By definition, the voids of the fabrics 13 are the voids between the threads 9, 17, 18 of these fabrics and practically all these voids 130 (FIG. 4) are capable of being impregnated with material 26 for the plies 7, 8. This feeding is effected, for instance, under vacuum, but other techniques of production are possible, for instance centrifuging techniques. The entire tire 1 is thus obtained by this casting.

For purposes of simplification, the other parts of the mold 19 as well as the means making it possible to fasten the bead rings 5 in the mold 19 have not been shown in the drawing. The lower face 14 of the ply 7 therefore constitutes, in part, the inner face 11 of the tire 1 and the material 26 which covers the reinforcement 6 constitutes the tread 27 of the tire 1.

The three-dimensional body 16 of each ply 7, 8 has a thickness "e" of 2 mm. The warp threads 17 and the woof threads 18 each have a cable structure formed of two yarns of tex No. 10 twisted to 1000 S twists per meter, assembled and twisted together to 1000 Z twists per meter.

The material of these cables 17, 18 is a thermoplastic polyester stabilized at 130° C. For each of these cables, the breaking strength is 7N, the elongation at rupture is 26%, and the diameter is 0.15 mm.

Figure 6:
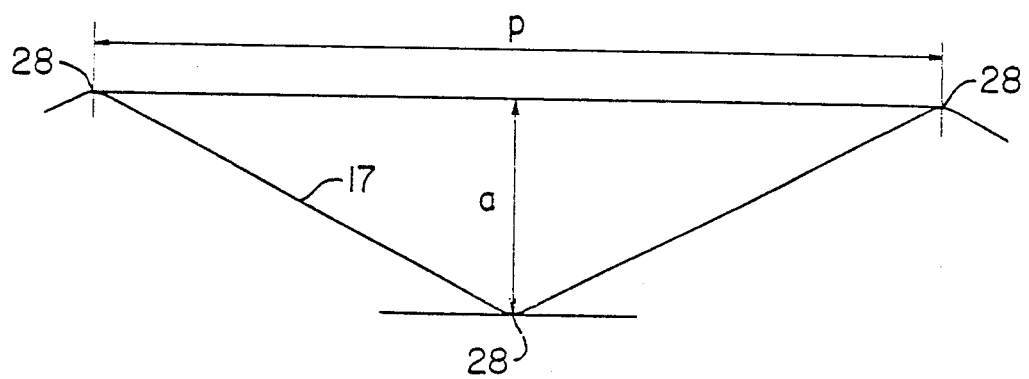
FIG. 6 shows an undulated warp thread which forms part of the structure of the three-dimensional body shown in FIGS. 3 and 4.

This body 16 comprises 735 warp cables 17 per 100 mm and 443 woof cables 18 per 100 mm. The counting of the cables 17, 18 is effected over the entire thickness "e" in a plane perpendicular to the principal faces 14, 15, this plane being either oriented in the mean direction of the woof cables 18 for the counting of the warp cables 17 or oriented in the mean direction of the warp cables 17 for the counting of the woof cables 18, the distance of 100 mm being measured along the intersection of the plane in question and a principal face 14, 15. The undulation of each warp cable 17 is characterized by an undulation rate $T = a/p$, in which "a" is the amplitude of the undulation measured between two successive crests and "p" is the wavelength of the undulation; FIG. 6 shows, by way of example, the amplitude "a" and the wavelength "p" for a warp cable 17 of the lower ply 7, two successive crests of the undulation being marked 28. The warp cables 17 have a rate T of the order of 12% in the example described, but this rate T may vary within very wide limits. The shape of this undulation may vary greatly; it may, for instance, have practically linear segments. There are 7 planes $P_{18}$ of woof cables 18 within the thickness "e".

Each of the reinforcement threads 9 has a cable structure formed of two yarns of tex No. 167 twisted to 320 S twists per meter, assembled and twisted together to 320 Z twists per meter.

The material of these reinforcement cables 9 is an aromatic polyamide. For each of these cables 9, the breaking strength is 54 daN, the elongation at rupture is 3.4% and the diameter is 0.7 mm. The plane $P_9$ in which the reinforcement cables 9 are located in each reinforcement ply 7, 8 is located, for instance, at one-quarter of the thickness "e", this plane $P_9$ being closer to the upper face 15 than to the lower face 14. The number of these reinforcement cables 9 is 100 for a distance of 100 mm measured perpendicular to the orientation of these threads 9.

The rigidity of the fabric 13 together with the body 16 and the reinforcement cables 9, on the one hand, and the rigidity of the body 16 by itself are measured. Each of these rigidities is measured, on the one hand, along the mean orientation of the warp cables 17, that is to say along the orientation of the reinforcement cables 9, it being then called the "warp rigidity," and, on the other hand, along the orientation of the woof cables 18, it being then called the "woof rigidity." In each case the rigidity corresponds to the ratio $F/L \epsilon$, F being the force necessary to obtain a fixed relative elongation $\epsilon$ which is equal in all cases to 2%, and L being the width of the fabric 13 or of the body 16 subjected to this measurement, this width being measured along a principal face 14, 15 perpendicular to the orientation in which the force F is exerted. This width is, for instance, equal to 100 mm, the ratio $F/L \epsilon$ being substantially independent of the value L when the numbers of cables 9, 17, 18 corresponding to this value L are large. The rigidity values are as follows: fabric 13: warp rigidity of 466 kN·m$^{-1}$; woof rigidity of 53 kN·m$^{-1}$; body 16: warp rigidity of 8.4 kN·m$^{-1}$; woof rigidity of 44 kN·m$^{-1}$.

Preferably the ratio between the rigidity of the fabric 13 measured according to the orientation of the reinforcement threads 9 and the rigidity of the body 16 by itself measured in this same orientation is at least equal to 10 and preferably at least equal to 40, whatever the structure of the threads 9, 17, 18, so that the reinforcement effect is due practically only to the reinforcement threads 9. Thus, in the example cited, the ratio of the warp rigidity of the fabric 13 to the warp rigidity of the body 16 is equal practically to 55.

All the geometrical characteristics of the cables 9, 17, 18 which are mentioned above correspond to the plies before incorporation in the tire 1, these plies being then arranged in such a manner that the principal faces 14, 15 are flat, as previously described.

Each ply 7, 8 is obtained, for instance, by cutting a ribbon out from a strip of fabric 13. The ends of this ribbon are then assembled end to end so as to produce a ring which is placed in the mold 19, the angles $\alpha_7$, $\alpha_8$ being obtained by the cutting of the ribbons. Upon the end-to-end assembling of the ends of the ribbon, it is important that two successive cables 9 be separated by a practically constant distance over the entire ring obtained, including at the place of the end-to-end attachment which may be effected by welding, without this being necessary.

It goes without saying that the assembling of the ends of the ribbons can be effected directly in the mold.

When the plies 7, 8 are incorporated in the tire 1, each of these plies has the following characteristics in the vicinity of the equatorial plane:

the warp cables 17 undulate in planes $P_{17}$ which are practically perpendicular to the principal faces 14, 15, the face 15 of each ply being, for instance, located above the face 14 of said ply, these planes forming the same angle $\alpha_7$, $\alpha_8$ with the equatorial plane as the reinforcement threads 9 of said ply;

the woof cables 18 are arranged practically within cylinders of axis of revolution yy' between the cylinders corresponding to the principal faces 14, 15, these woof cables 18 being practically perpendicular to the planes $P_{17}$ in which the warp cables 17 undulate;

the reinforcement cables 9 are arranged practically within a cylinder of axis of revolution yy', this cylinder being arranged between two cylinders of woof cables 18.

These arrangements, which in order to simplify the drawing have not been shown in it, are due to the end-to-end assembling of the ends of each ribbon of the fabric 13 which has been previously described with a generally flat shape, in FIGS. 3, 4.

The invention has the advantages described below:

(1) Each ply 7, 8 is very easy to arrange in the mold 19 since it is sufficient to place it, for instance, on the core 20. The three-dimensional body 16 of each ply 7, 8 guarantees accurate positioning in space of the reinforcement threads 9 within the tire 1, since it guarantees:

precise positioning of the reinforcement threads 9 with respect to each other;

precise positioning of the reinforcement plane $P_9$ with respect to the face 21 of the core 20, or with respect to any other part of the mold with which the body 16 is in contact.

(2) The precise positioning of the reinforcement threads 9 permits the production of tires of a very uniform quality of manufacture, practically with no risk of damage due to displacements of these reinforcement threads during the course of manufacture.

(3) In view of the fact that, for each plv 7, 8, the body 16 which holds the reinforcement threads 9 has a three-dimensional structure with a large number of threads 17, 18, this body introduces practically no heterogeneity in the tire 1. This tire then has practically perfect symmetry of revolution, without the body 16 causing harmful vibratory phenomena. Furthermore, there is very good bonding between the reinforcement 6 and the material with which it is in contact, so that this tire is characterized by satisfactory comfort and life.

(4) The plies 7, 8 are easy to produce by simple weaving, the reinforcement threads 9 being advantageously incorporated in the fabric 13 upon the same weaving operation as the threads 17, 18.

(5) The plies 7, 8 can be of light weight, using, for instance, for all the threads 9, 17, 18 organic polymers which furthermore have the advantage of limiting the risk of corrosion.

The permeability of the fabric 13 is preferably selected in such a manner that it permits rapid migration of the mixture forming the material 26 into the voids 130 of this fabric 13 upon the production of the tire 1. For this purpose, the permeability of the fabric 13 is preferably at least equal to $10^{-11} m^2 \cdot Pa^{-1} \cdot s^{-1}$, this permeability preferably varying from 500 to $1000 \cdot 10^{-11} m^2 \cdot Pa^{-1} \cdot s^{-1}$, these figures being determined for a fluid of a viscosity of 1 Pa·s. This permeability is obtained with a fabric 13 whose porosity is at least equal to 50%, the porosity preferably varying from 70% to 90%. This porosity, determined by calculation, is equal to the ratio v/V, v being the void volume of the fabric and V the total volume of the fabric, that is to say the sum of the void volume v and of the volume occupied by the threads 9, 17, 18.

The permeability and porosity of the fabric 13 are measured or calculated when the fabric is positioned so as to have a generally flat shape. These figures vary only slightly when the fabric 13 is used to produce the tire 1, that is to say when this fabric 13 is no longer flat.

When the fabric 13 comprises one or more monofilament reinforcement threads 9, it may be advantageous to make the fabric 13 in such a manner that these monofilament threads undulate slightly, for instance in the plane $P_9$, the undulation rate T of these threads being, for instance, less than 10%. This embodiment makes it possible to improve the fatigue strength of these reinforcement threads 9 in the tire 1. The orientation of each undulated thread 9 is then represented by its mean orientation when the fabric 13 is positioned in such a manner as to have a generally flat shape.

The invention covers the cases in which at least one ply 7, 8 is obtained directly by weaving, without it being necessary to cut the fabric 13 in order to obtain the angles $\alpha_7$, $\alpha_8$ in the tire 1. This is true, for instance, in the following three embodiments when the fabric 13 is arranged in such a manner as to have a generally flat shape.

(1) The fabric 13 is made in such a manner that the warp threads 17 have a mean orientation which is parallel to the sides of the ply, the reinforcement threads 9 forming within the fabric 13 woof threads whose mean orientation is parallel to that of the woof threads 18 and forms a nonzero angle other than 90° with the mean orientation of the warp threads 17.

(2) The reinforcement threads 9 form within the fabric 13 woof threads whose mean orientation is parallel to that of the woof threads 18 of the body 16 and perpendicular to the sides of the ply which are parallel to the mean orientation of the warp threads 17 of the body 16.

(3) The reinforcement threads 9 form within the fabric 13 warp threads whose mean orientation is parallel to the mean orientation of the warp threads 17 of the body and to the sides of the ply.

In these three embodiments, the plies 7, 8 are obtained directly in the form of a fabric ribbon 13, the ends of which need merely be connected together. The angle made by the reinforcement threads 9 with the equatorial plane zz' of the tire 1 is obtained directly by the position of the reinforcement threads 9 in the ribbon 13, without cutting, this angle being:

between 0° and 90° in the first embodiment;
equal to 90° in the second embodiment;
equal to 0° in the third embodiment.

The weaving can even be effected in such a manner that the fabric 13 of the reinforcement ply of the invention is obtained directly in the form of a ring, a cylinder, whether or not flattened, or any other curved shape which may possibly correspond to the shape of the ply when it is arranged within the tire.

The invention also covers embodiments in which the fabric 13 of the reinforcement ply of the invention comprises reinforcement threads 9 arranged on several levels within its thickness "e," for instance on several planes $P_9$, the direction of the threads 9 of one plane $P_9$ crossing in particular the direction of the threads 9 of the other adjacent plane or planes. This technique makes it possible, for instance, to produce the entire reinforcement 6 with a single ply. In this embodiment, it may be advantageous to obtain the fabric 13 in the manner that the reinforcement threads 9, in at least one of these planes $P_9$, replace either warp threads 17 or woof threads 18 of the body 16 in order to decrease the weight and increase the porosity and permeability. It goes without saying that these planes $P_9$ may possibly have different widths in the same ply. The above description of the use of several planes of reinforcement threads 9 presupposes, here again, that the fabric 13 is arranged in such a manner as to have a generally flat shape.

The invention also applies to cases in which the fabric 13 comprises reinforcement threads 9 arranged in such a manner that they have several orientations without these threads being arranged on planes.

This is true, for instance, when the threads 9 corresponding to each direction are arranged practically uniformly throughout the mass of the fabric 13. In the embodiments described above, each orientation corresponds either to the orientation of a reinforcement thread 9, if it is linear, or to the mean orientation of a reinforcement thread 9, if it is undulated, the fabric 13 in this case also being arranged in such a manner as to have a generally flat shape. When the fabric 13 comprises reinforcement threads 9 having several orientations, preferably for each of these orientations, the ratio between the rigidity of the fabric 13 and the rigidity of the body 16 by itself is at least equal to 10, and preferably at least equal to 40, these rigidities being measured along this given orientation in a manner similar to that which was described above, that is to say in particular for a relative elongation of $\epsilon$ of 2%, but in this measurement the fabric 13 comprises only reinforcement threads 9 which have the orientation under study, the other reinforcement threads 9 being removed. In all the aforementioned cases, it is preferably for the reinforcment threads 9 to be separated from each other by threads 17, 18 of the body 16 so that these reinforcement threads 9 are without contact with each other. In this way, the abrasion phenomena of these reinforcement threads are limited.

The reinforcement threads 9 of one and the same ply may be formed of different materials, whether there be one or more orientations for these threads; thus, for instance, the reinforcement threads 9 corresponding to one orientation may be metallic and the reinforcement threads 9 corresponding to another orientation may be made with an organic material, in particular an aromatic polyamide.

The reinforcement plies of the invention can be used for tires the method of manufacture of which is other than casting. Thus, for instance, these plies can be used to manufacture tires by building on a drum, in particular by arranging the lower plies directly on the drum so that they constitute at least a part of one face of the tires, the reinforcement threads being without contact with said face. In this case, it may be advantageous to impregnate the plies with a rubber before incorporating them in the tires.

The plies of the invention can be combined with conventional reinforcement plies arranged, for instance, in the crown of the tires over the plies of the invention.

The invention has been described above, in particular, with respect to the production of a crown reinforcement; however, the plies of the invention can be used to reinforce other parts of a tire, for instance the beads. The invention is, of course, not limited to the embodiments which have been described above.

What is claimed is:

1. A method for manufacturing a tire, characterized by the following steps:
   (1) directly arranging at least one reinforcement ply on a core of a tire casting mold having a mold cavity, the reinforcement ply being formed, at least in part, by a fabric having the following properties, when the fabric is arranged in such a manner as to have a generally flat shape with two flat principal faces:
   (a) the fabric comprises a three-dimensional body and reinforcement threads arranged in the body and held by the body;
   (b) practically all the voids in the fabric are capable of being impregnated with at least one elastomer-forming material which forms part of the structure of the tire;
   (c) the body is capable of retaining a three-dimensional structure even if the reinforcement threads are removed from the fabric;
   (d) the body comprises warp threads, each of these warp threads undulating practically in a plane perpendicular to the principal faces of the fabric and being alternately tangent to one of these faces and then to the other face;
   (e) the body comprises woof threads arranged between the warp threads practically in at least four planes within the thickness of the fabric, these planes being parallel to the principal faces of the fabric;

(f) the reinforcement threads are arranged practically in one plane, the reinforcement threads having the same orientation, the plane of the reinforcement threads being parallel to the planes of the woof threads;

(g) the reinforcement threads are without contact with at least one of the principal faces of the fabric;

(h) the reinforcement threads are separated from each other by the threads of the body in sudh a manner that the reinforcement threads are without contact with each other;

(i) the threads of the body have a cross-section whose surface has an area at most equal to one-quarter of the area of the surface of the cross-section of the reinforcement threads;

(j) the ratio between the rigidity of the fabric measured according to the orientation of the reinforcement threads and the rigidity of the body by itself measured in this same orientation is at least equal to 10, these rigidity measurements being carried out for a relative elongation of 2%;

(k) the porosity of the fabric is at least equal to 50%;

(l) the permeability of the fabric is at least equal to $10^{-11} m^2 \cdot Pa^{-1} \cdot s^{-1}$ for a fluid whose viscosity is 1 Pa·s;

(2) introducing the elastomer-forming material into the mold cavity to form the tire and to impregnate practically all the voids in the fabric.

2. A method for manufacturing a tire, characterized by the following steps:

(1) directly arranging at least one reinforcement ply on a building drum so that the ply constitutes at least a part of one face of the tire, reinforcement threads in the ply being without contact with said face, the reinforcement ply being formed, at least in part, by a fabric having the following properties, when the fabric is arranged in such a manner as to have a generally flat shape with two flat principal faces:

(a) the fabric comprises a three-dimensional body and reinforcement threads arranged in the body and held by the body;

(b) practically all the voids in the fabric are capable of being impregnated with at least one rubber material which forms part of the structure of the tire;

(c) the body is capable of retaining a three-dimensional structure even if the reinforcement threads are removed from the fabric;

(d) the body comprises warp threads, each of these warp threads undulating practically in a plane perpendicular to the principal faces of the fabric and being alternately tangent to one of these faces and then to the other face;

(e) the body comprises woof threads arranged between the warp threads practically in at least four planes within the thickness of the fabric, these planes being parallel to the principal faces of the fabric;

(f) the reinforcement threads are arranged practically in one plane, the reinforcement threads having the same orientation, the plane of the reinforcement threads being parallel to the planes of the woof threads;

(g) the reinforcement threads are without contact with at least one of the principal faces of the fabric;

(h) the reinforcement threads are separated from each other by the threads of the body in such a manner that the reinforcement threads are without contact with each other;

(i) the threads of the body have a cross-section whose surface has an area at most equal to one-quarter of the area of the surface of the cross-section of the reinforcement threads;

(j) the ratio between the rigidity of the fabric measured according to the orientation of the reinforcement threads and the rigidity of the body by itself measured in this same orientation is at least equal to 10, these rigidity measurements being carried out for a relative elongation of 2%;

(k) the porosity of the fabric is at least equal to 50%;

(l) the permeability of the fabric is at least equal to $10^{-11} m^2 \cdot Pa^{-1} \cdot s^{-1}$ for a fluid whose viscosity is 1 Pa·s;

(2) impregnating practically all the voids in the fabric with the rubber material before incorporating the ply in the tire.

* * * * *